United States Patent [19]

Quon

[11] Patent Number: 4,623,579

[45] Date of Patent: Nov. 18, 1986

[54] YARN PRODUCT WITH COMBINED FLUORESCENT-PHOSPHORESCENT APPEARANCE AND METHOD

[75] Inventor: Joe S. Quon, Sunnyside, N.Y.

[73] Assignee: Multi-Tex Products Corp., Kearny, N.J.

[21] Appl. No.: 784,704

[22] Filed: Oct. 4, 1985

Related U.S. Application Data

[63] Continuation of Ser. No. 538,870, Oct. 4, 1983, abandoned.

[51] Int. Cl.$^4$ .............................................. D02G 3/00
[52] U.S. Cl. ..................... 428/215; 156/67; 156/271; 428/216; 428/242; 428/283; 428/327; 428/328; 428/334; 428/372; 428/378; 428/389; 428/394; 428/690
[58] Field of Search ................ 156/67, 271; 428/215, 428/216, 242, 283, 327, 328, 334, 372, 378, 389, 394, 690

[56] References Cited

U.S. PATENT DOCUMENTS

| | | | |
|---|---|---|---|
| 3,347,727 | 10/1967 | Bobkowicz et al. | 156/271 |
| 3,361,616 | 1/1968 | Scharf | 428/376 |
| 3,528,877 | 9/1970 | Scharf | 428/397 |
| 3,608,298 | 9/1971 | Schoots | 156/67 |
| 4,183,989 | 1/1980 | Tooth | 428/916 |
| 4,211,813 | 7/1980 | Gravisse et al. | 428/690 |
| 4,336,092 | 6/1982 | Wasserman | 428/395 |
| 4,477,521 | 10/1984 | Lehmann et al. | 428/336 |

Primary Examiner—George F. Lesmes
Assistant Examiner—William M. Atkinson
Attorney, Agent, or Firm—David A. Jackson

[57] ABSTRACT

A decorative composite article which may be longitudinally slit to form a yarn product is disclosed which has a combined a phosphorescent and fluorescent decorative appearance. The composite article includes paired outer layers of a thermoplastic resin between which is disposed a decorative layer comprising a composition including a colorant component having a phosphorescent colorant and a fluorescent colorant, and a resin binder material. The fluorescent colorant is present in an amount by weight that is up to an amount equal to that of the phosphorescent colorant. The present binder material may be selected from polyester, polyurethane and acrylic polymers and copolymers, with a mixture of a butadiene-acrylonitrile rubber and polyurethane composition being preferred.

The composite article is prepared by the coating of two resin films with the above described composition, followed by contacting the films with each other on their coated surfaces and applying heat and pressure to bond them together to form the decorative composite article. The resulting composite article may be slit longitudinally to a variety of widths to form a yarn product useful in a variety of decorative and security applications. The product of the present invention offers improved flexural strength in combination with unique decorative appearance, and may be easily and inexpensively manufactured.

9 Claims, No Drawings

YARN PRODUCT WITH COMBINED FLUORESCENT-PHOSPHORESCENT APPEARANCE AND METHOD

This application is a continuation of application Ser. No. 538,870, filed Oct. 14, 1983, now abandoned.

BACKGROUND OF THE INVENTION

1. Field of the Invention

The present invention relates to compositions useful for decorative applications, and particularly to compositions offering novel reflective effects when embodied in synthetic sheet and yarn products.

2. Description of the Prior Art

Numerous products are known that offer various attractive, decorative effects when embodied in sheet and yarn form. In particular, composite yarn products are conventionally prepared, which offer materials ranging from ribbon strips to light-conductive fibers. Examples of such products are disclosed in U.S. Pat. No. 2,166,819 to Miller which prepares a two-ply ribbon strip by the adhesive bonding of two layers of plastic to each other, followed by the longitudinal slitting of the composite product. Similarly, U.S. Pat. No. 3,361,616 to Scharf discloses the preparation of a composite yarn by the disposition of strands of thread or strands of metalized material between two resinous sheets. Also, U.S. Pat. No. 3,666,587 to Nagao disclosed the preparation of a light-conducting fiber by the preparation of a sandwich of a polystyrene material between acrylic sheet materials. Finally, U.S. Pat. No. 4,336,092 to Wasserman, discloses the preparation of a retroreflective fiber by the disposition of retroreflective beads upon a supporting polyester film, laminating a film thereto and thereafter slitting the resulting laminate.

The reflective products presently available, particularly those products formed into yarn materials suffer from certain disadvantages, as outlined in the Wasserman patent discussed above. Thus, attempts to bond various reflective materials to resinous films are frequently unsuccessful, as the reflective material tends to delaminate or otherwise detach from the film when it is formed into a yarn product, due to the elastic nature of the yarn. Moreover, the nature of the reflective materials as applied by Wasserman was found by the present inventor to offer further disadvantages in that the integrity of the resulting laminate product was short-lived. Thus, the particulate materials sandwiched between the resin films tended to rupture the films when yarn products were formed and spun, with the result that the composite reflective yarn materials were commercially unsuitable. Even in the instance where the reflective materials were in finally divided particulate form, delamination and surface discontinuities of other types developed with the result that the products were unattractive and commercially undesirable.

In addition, the advent of sophisticated security devices has brought with it a new application for reflective materials not heretofore appreciated or possible. In particular, certain materials in addition to having fluorescent ability i.e. the ability to take light from particular and exhibit illumination, have been considered for use as security markers in financial applications, such as for bank drafts, and for currency. Thus, it has been desirable to develop fibers utilizing fluorescent materials that would be capable of distinctive identification under ultraviolet or low wavelength light i.e. in the blue-violet spectrum, such identification, however, to be undetectable under ordinary visible light, so that the resulting patterns could not be duplicated by counterfeiters and others attempting similar illegal activities.

The difficulties recited with regard to the preparation of reflective yarns have thus far prevented the wide spread development of yarns offering these features, in a manner which makes them useful both for decorative purposes and for the more serious commercial purposes enumerated above. A need therefore exists for the development of a coating composition in associated yarn products which meets the objectives mentioned above, by offering a product that is sufficiently stable to withstand the rigors of processing and use, regardless of whether decorative or security applications are contemplated. The present invention is believed to meet the above stated objectives.

SUMMARY OF THE INVENTION

In accordance with the present invention, a decorative coating composition is disclosed which includes a colorant component comprising a first phosphorescent colorant and a second fluorescent colorant, and a resin binder material in which the colorants are disposed. The colorant component may be present in an amount by weight of up to about 50% of the total weight of the coating composition, with the resin binder and suitable additives making up the remainder.

The phosphorescent colorant and the fluorescent colorant may comprise particulate materials having particle sizes preferably on the order of up to about 15 microns. The phosphorescent and fluorescent colorants may be present within a range of ratios of fluorescent colorant to phosphorescent colorant of from 5:95 to 50:50, such ratios based upon a weight calculation. The phosphorescent colorant may comprise an inorganic pigment based upon simple and complex metal sulfides such as zinc sulfide, while the fluorescent colorant may comprise a particulate, solid phase dispersion of a fluorescing organic dye contained within a transparent organic resin particle.

The resin binder may be prepared from a variety of thermoplastic resins including polyesters such as polyethylene terephthalate, acrylic polymers and copolymers, such as acrylonitrile, certain elastomeric materials such as acrylonitrile-butadiene rubbers, polyurethanes and mixtures thereof. A particular resin binder comprises a mixture of a polyurethane and an acrylonitrile-butadiene rubber.

The present invention includes a decorative composite article having a combined fluorescent and phosphorescent appearance, comprising two outer layers, each layer comprising a thermoplastic resin base having a thickness of up to about 1 mil, and a layer of the decorative composition of the present invention applied thereto to a thickness of about 2 mils to form an intermediate or interstitial decorative layer having a thickness on the order of 4 mil. The decorative composite may be prepared by the application of the coating composition of the present invention to a thermoplastic resin base, followed by the lamination of two such bases with their coated surfaces in contact with each other, by the application of heat and pressure. The resin base may be prepared from a variety of suitable thermoplastic resins, including polyesters such as polyethylene terephthalate, and like materials.

In a further embodiment of the present invention a yarn product may be prepared which comprises strands of the decorative composite article slit to various widths depending upon end utilities.

The compositions of the present invention are self-curing so that the composite articles need not be processed after initial application of the composition and drying thereof. Further, the combined capability of phosphorescence and fluorescence renders the articles including the yarn products produced thereby highly attractive and useful in a variety of decorative applications heretofore impossible with a single material. The properties of the coating composition are such that the articles including yarn products produced therewith withstand elongation and other shear forces attendant to processing, as in the instance where yarn products are prepared and further processed.

Accordingly, it is a principal object of the present invention to provide an improved decorative article offering a combination of broad light reflective properties and durability.

It is a further object of the present invention to provide a decorative article as aforesaid which may be prepared simply and inexpensively.

It is a still further object of the present invention to provide a decorative article that exhibits both phosphorescent and fluorescent properties.

It is a still further object of the present invention to prepare a decorative article capable of further processing to form a durable and attractive yarn product.

It is a yet further object of the present invention to develop a decorative composition which may offer the aforenoted properties of durability and broad reflective capability when applied to suitable substrates.

Other objects and advantages will become apparent to those skilled in the art from a review of the ensuing description.

DETAILED DESCRIPTION

In accordance with the present invention, decorative articles may be prepared having a combined fluorescent and phosphorescent decorative capability, which comprise paired thermolastic resin bases or films to one surface of which has been applied a layer of a composition, the composition in turn comprising a phosphorescent colorant, a fluorescent colorant and a resin binder material, wherein the phosphorescent colorant and fluorescent colorant in combination are present in an amount of up to about 50% by weight of the total coating composition, with the resin binder and suitable additives such as solvents, and the like, comprising the remainder. The coated resin bases are bonded to each other, with their coated surfaces in contact.

The thermoplastic resinous materials suitable for use as the base or substrate of the articles of the present invention may be selected from known materials such as polyesters, including polyethylene terephthalate, polyolefins such as polypropylene and polystyrene, vinyl polymers such as polyvinyl chloride, polycarbonates such as ABS resins, and others. Preferably, polyester films, and in particular such films having thicknesses ranging from about 0.25 to about 1.0 mil may be used. A suitable resin is well known under the trademark "MYLAR ®" which is manufactured by E. I. Dupont De Nemours and Co., Wilmington, Del. A particular thickness useful in accordance with the present invention is 0.48 mil.

The decorative coating composition applied to the resin base comprises a colorant component prepared to include a phosphorescent colorant and a fluorescent colorant. The phosphorescent colorant and fluorescent colorant may be present with respect to each other in a ratio of phosphorescent colorant to fluorescent colorant of from 50:50 to 95:5, or from 1:1 to 19:1. Naturally, the exact ratio of the phosphorescent colorant to the fluorescent colorant will vary depending upon the decorative effect that is desired in the final coated article.

Suitable phosphorescent colorants include well known phosphorescent pigments such as those based on zinc sulfide, cadium sulfide or complex sulfides including both metals. In the instance where inorganic phosphorescent pigments are prepared, they should preferably be utilized with particle sizes ranging up to about a size capable of passing through a 100 mesh screen, with approximate particle sizes ranging from about 4 to 10 microns. A particular phosphorescent pigment is identified as "EXCITE 2330" manufactured by U.S.R. Optonix, Incorporated of Hackettstown, N.J. This colorant is an inorganic phosphorescent powder based upon zinc sulfide. "EXCITE 2330" has a pale green daylight color and responds to excitation by daylight, incandescent light, fluorescent light or ultraviolet light and retains an afterglow for up to about ten hours after the removal of exposure to any of the aforenoted light sources. Naturally, this pigment is exemplary of phosphorescent pigments useful in accordance with the present invention, it being understood that other phosphorescent pigments, dyes and the like would be similarly useful.

The fluorescent colorants useful in accordance with the present invention may likewise vary in their composition as stated. Thus, both pigments and dyes known in the art are useful to provide the fluorescent qualities to the resulting coating. Thus, suitable fluorescent colorants include pigments and dyes, and in particular may include a variety of such materials known by the registered trademark "DAY-GLO ®" which are produced and sold by the Day-Glo Color Corporation of Cleveland, Oh. For example, suitable fluorescent pigments would include solid solutions of fluorescent dyes disposed in thermoplastic resin matrix. The thermoplastic resin may be selected from sulphonamide, triazine and aldehyde resins, which offer an essentially transparent particulate solid through which the dye may be dispersed and offer visual reaction to impinging light waves. The resin particles may range in size up to about 50 microns with sizes of 3 to 15 microns being preferred.

A particular fluorescent pigment useful in accordance with the present invention is identified as the DAY-GLO ® A series, No. A-594-5. Among the colors available through the Day-Glo Color Corporation are a variety of violet, pink, red, orange and yellow variations, green and blue. Naturally, other color variations are available through alternate manufacturing sources, and the invention is not limited to the aforenoted colors or compositions described above.

One of the aspects of the present invention is the unique reflective effect achieved by the combined color component of the decorative coating of the present invention. The combined colorants overlap somewhat in their properties, so that, for example, the phosphorescent colorant exhibits certain fluorescent properties which favorably coact with those of the fluorescent component to offer an improved richness and brilliance of reflectivity in use. Also, the combination of these properties results in the subtle change in visual appearance of the coated products as lighting conditions change, which adds further attractiveness and aesthetic appeal, particularly when the articles of the present invention are prepared as yarn products which are woven into garments or other materials having complementary coloration. Thus, the warmth, brilliance or other positive qualities of a given color scheme can be accentuated and thereby improved by the incorporation of a quantity of yarn prepared in accordance with the present invention.

The colorant component of the present invention is prepared with a resin binder in an amount whereby the colorant may range up to 50% by weight of the total composition. Suitable resin binders include polyesters such as polyethylene terephthalate, polurethanes and acrylic polymers and copolymers, such as acrylonitrile homopolymers and acrylonitrile copolymers and mixtures of these. Other elastomeric materials generally known as nitrile rubbers, may also be used herein. A particular resin binder is a copolymer of butadiene and acrylonitrile manufactured by Clifton Adhesive, Inc. of Wayne, N.J. and identified by the product number LA 2524-3. It has a viscosity of 600 CPS, a flash point of 35° F. and a solids content of 21.3% ±0.2. It is clear in color and is soluble in methylethyl ketone (MEK).

Suitable polyurethane resins include resins formed by the reaction of a polyol with an isocyanate compound as aliphatic and aromatic isocyanates. The polyurethane may include in its formulation an effective amount of a catalyst such as benzoyl peroxide, substituted and unsubstituted azobisbutyronitrile, and metal catalysts such as sodium, lithium, and organo metallic catalysts (i.e. Ziegler-type catalysts). The above list of resins and catalysts is representative only, as the invention contemplates a variety of such resins within its scope.

The adhesive or resin binder may comprise mixtures of the aforenoted materials, and, for example, may include a mixture of a polyurethane and an acrylonitrile or polyester resin. The exact proportions of each material in the final composition may vary within the broad limits expressed earlier for the presence of the resin binder on the present composition.

The composition may also contain secondary ingredients such as solvents and where appropriate, fillers, extenders and the like. Suitable solvents include the lower alkanols, and their corresponding alkyl acetates, as well as alkyl ketones. A particular solvent that is used, is methylethyl ketone (MEK), which may be present in an amount effective to form a final composition having a viscosity of about 23 seconds as measured with a No. 3 Zahn Cup. The solvent may, for example, be present in an amount of up to about 20% by volume of the final composition.

The composition of the present invention may be prepared by a sequential mixture of the respective ingredients which may preferably commence by the dispersion of the fluorescent pigment in an organic solvent such as methyl ethyl ketone. Subsequently the remainder of the ingredients, comprising the phosphorescent colorant and the adhesive may be added in any order with respect to each other. The mixture or dispersion should be maintained under agitation, however the degree of agitation is not critical. After all of the ingredients have been admixed, the resulting composition should be adjusted in viscosity to approximately 23 seconds as measured with a No. 3 Zahn Cup. In the event that the viscosity of the composition is higher than the aforementioned value, additional methylethyl ketone may be added with continual agitation and monitoring.

After the composition is prepared, it may be maintained in a container and stored for later use, or for immediate application to an appropriate resin base. In the event that the coating composition is to be immediately applied to the resin base, it should be maintained in a dispenser under agitation, and preferably with an agitator having a speed of rotation of about 200 RPM. In particular, a flat bottom stainless steel dispenser should be utilized with a rotating agitator having blades with flat edges corresponding to the flat bottom of the dispenser, to maintain the phosphorescent pigment in suspension.

The application of the coating composition to the substrate may be conducted by a roller coating procedure which, however, follows certain specific guidelines. In particular, the dispenser containing the coating composition is preferably positioned to prevent the composition from developing excessive velocity on pouring toward the rollers, so that the phosphorescent pigment does not unduly disperse. For example, in the instance where 10 inch rollers are utilized, the mixture is fed to the rollers at the rate of 19 feet per minute or 1.1 pints of mixture per minute. The roller speed generally exceeds 19 feet per minute and may preferably be 19.1 feet per minute. The mixture is fed on to the rollers and a coating of approximately 2 mil thickness is applied.

After the application of the coating, the coated resin base passes a drying station, where it is exposed to a drying temperature which may range up to about 280° F. The resin base may be in a continuous film which moves past the drying station at a speed of about 20 feet per minute so that respective portions of the film have a dwell time in this step of about 3 seconds.

As mentioned earlier, the present invention includes a final article bearing the combined phosphorescent and fluorescent pigment, which has a variety of uses. The combined article comprises a sandwich-type multi-layered article prepared by the lamination of two indefinite lengths of the resin base coated with the composition of the present invention, which are bonded to each other with their coated surfaces juxtaposed. Thus, two indefinite lengths of coated resin base prepared as described above may be passed between the nip of pressure rollers to form a composite having broad outer surfaces comprising the resin base, and an interior layer comprising a double thickness of the coating composition of the present invention. Thus, the final article may have a total thickness of up to about 6 mil, comprising a 4 mil interstitial layer of the coating composition and two approximately 1.0 mil resin base films, each on either broad surface thereof. The lamination of the respective coated films to each other may take place, for example, at a temperature of 180° F., and a pressure of about 400 PSI. The resulting laminate may exit the nip of the pressure rollers and may be placed on a wind up roller. The nature of the coating composition is such that the laminate will be self-curing at room temperature.

As mentioned herein, the present invention also includes a yarn product, comprising the composite article of the present invention prepared to a variety of yarn widths by a slitting operation. The composite article may thus be withdrawn from the wind up reel a suitable time period after lamination has taken place, such as 48 hours, and may thereafter be longitudinally slit to a variety of widths in accordance with procedures and utilizing apparatus known in the art. Thus, a variety of procedures and apparatus such as disclosed in U.S. Pat. Nos. 3,528,877; 3,666,587 and 4,336,092 may all be employed to slit the laminated article of the present invention into a variety of yarns for various commercial applications. The disclosures of the aforenoted patents are accordingly incorporated herein by reference insofar as they disclose slitting techniques and apparatus useful in accordance with the present invention.

The present invention will be better understood from a consideration of the following illustrative examples, wherein all percentages expressed are to be considered as percent by weight unless otherwise defined.

EXAMPLE I

A combined pigment component was prepared, with a phosphorescent pigment known as "EXCITE 2330" manufactured by U.S.R. Optonix, Incorporated. The phosphorescent pigment had a particle size ranging up to about 10 microns and comprises an inorganic phosphorescent powder based upon zinc sulfide.

A fluorescent pigment was selected which was manufactured by the Day-Glo Color Corp. and is identified by the No. A-594-5. Seven pounds of the fluorescent colorant, comprising resin particles having average sizes of 10 to 15 microns, was dispersed in a quantity of methylethyl ketone. Thereafter, seven pounds of the phosphorescent pigment mentioned above was added thereto, after which a combined resin binder prepared from 13 pounds of a polyurethane prepared from a polyol and an aromatic isocyanate, and having a viscosity of 30 seconds measured with the No. 3 Zahn Cup, and seven pounds of a copolymer of butadiene and acrylonitrile, having a 21.2% solids and identified as LA 2524-2, manufactured by Clifton Adhesive, Incorporated was added. The foregoing ingredients were mixed with agitation and maintained thereunder while being stored for use. The coating composition was placed in a steel dispenser and was agitated with a rotary bladed mixer at a speed of 200 RPM.

EXAMPLE II

A resin base was prepared in a continuous film of Mylar ® having a thickness of about 48 gauge (0.48 mil). This continuous film was prepared in a 10 inch width and was directed past a roller coating station, with rollers having a 10 inch length. The rollers were fed a quantity of the composition prepared in EXAMPLE I, at a rate of about 19 feet per minute. The roller speed exceeded the rate of composition speed by approximately 0.1 foot per minute and the composition was applied to the coating rollers along an indirect, cascading line of travel. The composition was applied to a thickness of about 2 mil on a continuous basis, and the thus coated resin base film was passed through a drying station, where the film was exposed to a temperature of about 280° F. for a period of about 3 seconds dwell time. The rate of travel of the coated film at this point was approximately 20 feet per minute.

EXAMPLE III

In this Example, the final composite article of the present invention was prepared, by the lamination of two identical coated films prepared in accordance with the procedure outlined in EXAMPLE II above. The films were directed toward the nip of pressure rollers, with the coated surfaces juxtaposed to each other. The films passed through the pressure roller stand, of which one roller was steel and the other rubber surfaced. The roller assembly or stand was heated, so that the lamination took place at a temperature of about 180° F. and a pressure on the order of about 400 PSI. The resulting laminated exited the pressure roller and was directed to a single take-up reel, where it was stored for later processing.

In the instance where a yarn product was to be prepared, the take-up reel was then directed through an appropriate slitting apparatus, comprising parallel knives or other comparable apparatus as disclosed in the aforementioned U.S. patents earlier incorporated herein by reference, whereupon a plurality of composite yarn strands or ribbons were formed, which were then taken up on individual bobbins, where they would be available for later use, such as in the weaving of reflective fabrics for decorative purposes, and other desired applications.

As mentioned earlier, the present invention includes both the composition, the coated article and the composite laminate prepared therefrom, which laminate has a variety of uses for both security and decorative applications. The composite structure of the present articles renders them eminently well suited for weaving or other fabric forming operations, as they are able to withstand the shear forces that are imposed upon thread during such processing, without exhibiting delamination or other undesirable deterioration. The broad range of reflective properties imparted to the present articles by the combination of the phosphorescent and fluorescent colorants in the manner disclosed herein, contributes to a product having improved depth and brilliance of color, and unique reflectivity that finds no parallel in other commercially available products of this general type. The ease and economy of manufacture are likewise advantages of the present invention that enhance its commercial value.

This invention may be embodied in other forms or carried out in other ways without departing from the spirit or essential characteristics thereof. The present disclosure is therefore to be considered as in all respects illustrative and not restrictive, the scope of the invention being indicated by the appended Claims, and all changes which come within the meaning and range of equivalency are intended to be embraced therein.

What is claimed is:

1. A decorative composite laminated yarn product offering a combined phosphorescent and fluorescent decorative appearance, said yarn product comprising one or more filaments prepared from a composite laminate, said composite laminate consisting essentially of:
   A. paired outer layers of a thermoplastic resin, each of said outer layers having a thickness of up to about 1 mil; and
   B. a decorative layer disposed between said outer layers, said decorative layer having a thickness of up to about 4 mil and prepared from a composition consisting of;
      i. a colorant component, and
      ii. a resin binder material,
      iii. said colorant component present in a amount weight of up to 50% of the total weight of said composition,
      iv. said colorant component consisting of a phosphorescent colorant consisting essentially of an inorganic pigment in particulate form having a particle size ranging from about 4 microns to about 10 microns said inorganic pigment based on zinc sulfide, and a fluorescent colorant, said fluorescent colorant having a particle size ranging from about 3 microns to about 50 microns and comprising a fluorescing organic dye disposed in a thermoplastic resin material, and said phosphorescent colorant and said fluorescent colorant are present in a weight ratio with respect to each other that ranges from 1:1 to 19:1, and v. said resin binder material selected from the group consisting of polyester resins, polyurethan resins, acrylic polymers and copolymers, polyolefins, elastomers, and mixture thereof.

2. The laminated yarn product of claim 1 wherein the resin binder material in said composition comprises a polyurethane elastomer.

3. The laminated yarn product of claim 1 wherein said outer layers are prepared from films of a thermoplastic resin selected from the group consisting of polyesters, polyolefins, vinyl polymers and copolymers, and polycarbonates.

4. The laminated yarn product of claim 3 wherein said outer layers are prepared from a polyester film.

5. The laminated yarn product of claim 1 wherein said polyester resins comprise polyethylene terephthalate, said polyurethane resins are prepared from the reaction of an aromatic isocyanate and a polyol, said acrylic polymers comprise acrylonitrile, and said acrylic copolymers comprise a butadiene-acrylonitrile rubber.

6. The laminated yarn product of claim 5 wherein said mixture of resins comprises a mixture of said polyurethane resin and said butadiene-acrylonitrile rubber.

7. A method for preparing a decorative composite article offering a combined phosphorescent and fluorescent decorative appearance, consisting essentially of:

A. providing a length of a thermoplastic resinous film having a thickness of up to about 1 mil;

B. coating the thermoplastic resinous film with a composition consisting of
i. a colorant component, and
ii. a resin binder material,
iii. said colorant component present in an amount by weight of up to 50% of the total weight of said composition, iv. said colorant component consisting of a phosphorescent colorant consisting essentially of an inorganic pigment in particulate form having a particle size ranging from about 4 microns to about 10 microns, said inorganic pigment based on zinc sulfide, and a fluorescent colorant having a particle size ranging from about 3 microns to about 50 microns and comprising a fluorescing organic dye disposed in a thermoplastic resin material, and said phorphorescent colorant and said fluorescent colorant are present in a weight ration with respect to each other, that ranges 1:1 to 19:1, v. said resin binder material selected from the group consisting of polyester resins, polyurethane resins, acrylic polymers and copolymers, polyolefins, elastomers, and mixtures thereof, vi. said composition having a viscosity of 23 seconds as measured with a No. 3 Zahn cup, and vii. wherein said composition is applied to said thermoplastic film to a thickness of up to about 2 mil and at a controlled velocity to prevent non uniform dispersion of said phosphorescent pigment when said composition impacts said film;

C. drying the film coating in accordance with Step B above;

D. preparing a second indefinite length of a coated film in accordance with the procedures outlined in Steps A-C above;

E. laminating the coated films prepared in Steps A-D above to each other along their coated surfaces, by passing said films together through heated pressure rollers; and F. longitudinally slitting the composite laminate product prepared in Step E to form a plurality of filaments of said yarn product.

8. The method of claim 7 wherein said thermoplastic resin is selected from the group consisting of polyester resins, polyolefin resins, vinyl polymers and copolymers, and polycarbonates.

9. The method of claim 7 wherein said films are bonded to each other at a pressure of about 400 PSI and a temperature of about 180° F.

* * * * *